United States Patent [19]
Chiodini

[11] Patent Number: 5,949,794
[45] Date of Patent: Sep. 7, 1999

[54] TIME SYMMETRICAL CONTROL SIGNAL, AND A RECEIVER AND TRANSMISSION SYSTEM EMPLOYING THE SAME

[75] Inventor: Alain Chiodini, Boulogne, France

[73] Assignee: Alcatel Mobile Communication France, Paris, France

[21] Appl. No.: 08/492,613

[22] Filed: Jun. 20, 1995

[30] Foreign Application Priority Data

Jun. 21, 1994 [FR] France ..................... 9407590

[51] Int. Cl.⁶ .............. H04J 3/06; H04L 27/30; H04L 27/06; H04L 7/06
[52] U.S. Cl. ............ 370/503; 370/335; 370/441; 370/500; 375/206; 375/344; 375/345; 375/364
[58] Field of Search .................. 370/18, 105.3, 370/105.1, 100.1, 107, 95.3, 110.1, 29, 74, 98, 101, 104.1, 294, 441, 503, 504, 335; 375/205, 206, 224, 214, 344, 345, 364, 368, 282; 455/260, 67.3; 340/825.22

[56] References Cited

U.S. PATENT DOCUMENTS

| | | | |
|---|---|---|---|
| 3,702,379 | 11/1972 | Peterson et al. | 370/500 |
| 4,847,676 | 7/1989 | Oliphant et al. | 358/12 |
| 5,235,616 | 8/1993 | Sebilet | 375/206 |
| 5,297,162 | 3/1994 | Lee et al. | 375/206 |
| 5,519,730 | 5/1996 | Jasper et al. | 370/500 |
| 5,559,723 | 9/1996 | Mourot et al. | 364/517 |
| 5,703,908 | 12/1997 | Mammone et al. | 370/500 |

FOREIGN PATENT DOCUMENTS

| | | |
|---|---|---|
| 0551803A1 | 7/1993 | European Pat. Off. . |
| WO8701490 | 3/1987 | WIPO . |
| WO9100660 | 1/1991 | WIPO . |
| WO9102415 | 5/1991 | WIPO . |

*Primary Examiner*—Jason Chan
*Assistant Examiner*—Melissa Kay Carman
*Attorney, Agent, or Firm*—Sughrue, Mion, Zinn, Macpeak & Seas, PLLC

[57] ABSTRACT

The invention relates to a control signal for receivers, said control signal being formed by juxtaposing two signal elements of equal duration, and time symmetrical. For example, the signal comprises at least one first pseudo-random noise digital sequence $s(N_s-1)$ to $s(0)$ and, periodically, at least one second digital sequence $s(N_s-1)$ to $s(0)$, corresponding to the inverse, obtained by time symmetry, of said first sequence. The signal may be used in particular for performing time and frequency synchronization on receivers and/or for equalizing signals received by said receivers. The invention also relates to methods and apparatuses that use said signal.

39 Claims, 5 Drawing Sheets

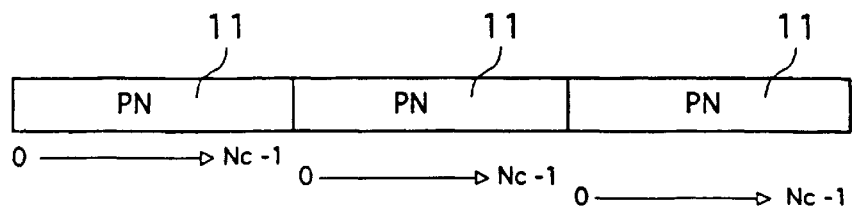
Fig. 1 (PRIOR ART)
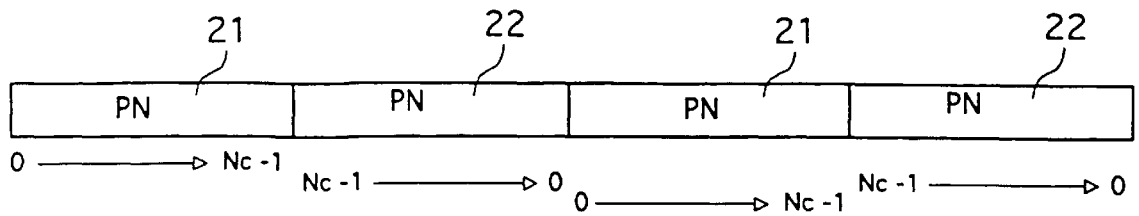
Fig. 2
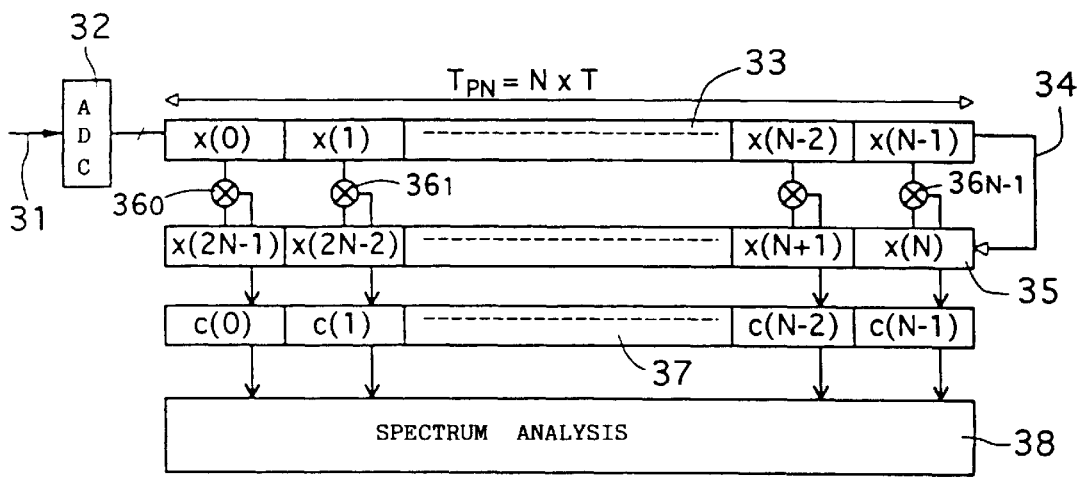
Fig. 3
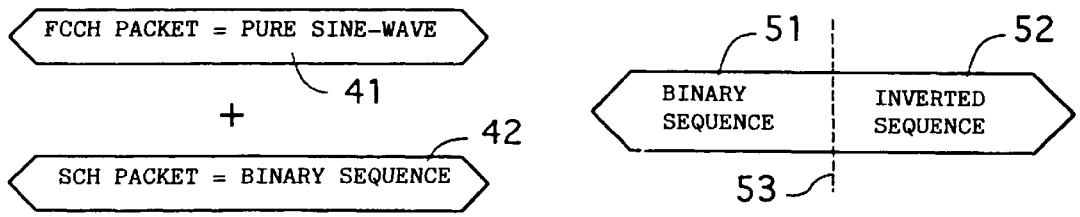
Fig. 4 (PRIOR ART)
Fig. 5

5,949,794

TIME SYMMETRICAL CONTROL SIGNAL, AND A RECEIVER AND TRANSMISSION SYSTEM EMPLOYING THE SAME

FIELD OF THE INVENTION

The invention relates to transmitting digital signals, in particular to mobile stations. More precisely, the invention relates to controlling and optimizing reception of such signals. In particular, the invention relates to time and frequency synchronization of receivers that receive such signals, and to channel equalization.

The invention can be applied to any type of digital transmission system, whether it be a radio-telephone system, a radio-broadcasting system, or a radio-messaging system, etc. The invention is particularly applicable to cellular radio-telephone systems. For example, the invention may be implemented in satellite-broadcast CDMA (code division multiple access) systems, or in terrestrial-broadcast TDMA (time division multiple access) systems, such as the GSM system.

BACKGROUND OF THE INVENTION

In cellular radio-telephone systems, synchronization acquisition is the first operation to be performed by a terminal once it has been switched on. This operation generally comprises two stages:

- a frequency synchronization first stage that consists in acquiring the frequency reference of the base station; and
- a time synchronization second stage that consists in acquiring the clock of the base station.

Conventionally, these two operations are independent from each other. They use reference signals that are distinct and independent.

In this way, in a code division multiple access system, each base station broadcasts two signals intended for acquiring and maintaining synchronization, namely: the pilot signal constituted by continuous transmission of a sequence of pseudo-random noise PN serving to spread data, and not modulated by information; this signal, which is tracked continuously by the mobile station, guarantees that time and frequency synchronization is maintained; and the synchronization signal which conveys useful information while telephone calls are being set up or received (cell identity, pilot signal power, and initial time offset of the spreading sequence).

That technique is complex and it is not adapted to satellite broadcast systems. For example, adapting a CDMA system to the Globalstar system poses two major problems:

- the signals coming from the satellite are affected by considerable Doppler displacement because of the high orbiting speed of the satellite; and
- the distance between the mobile station and the satellite in low Earth orbit (LEO) varies by several thousand kilometers in a few minutes, and, as a result, the instantaneous variation in propagation time is considerable.

Likewise, in a time division multiple access system, such as the GSM system, initial synchronization is performed by means of two specific packets transmitted at regular time intervals over the BCCH (broadcast control channel) carrier:

- the first packet, which is referred to as the "FCCH" (frequency correction channel), enables the mobile station to acquire the frequency reference of the base station; this packet contains a pure sine-wave; and
- the second packet, which is referred to as the "SCH" (synchronization channel), enables the mobile station to acquire the time reference; this packet contains a binary sequence which has advantageous autocorrelation properties.

Those two packets, which are broadcast regularly, occupy non-negligible resources on the BCCH carrier.

Furthermore, it is known that, when a transmitter (base station or mobile station) transmits a sequence of symbols over a transmission channel, the transmitted sequence is degraded, so that the sequence of symbols as received by the receiver is not identical to the sequence as transmitted. The main source of such degradation is the interference between symbols that occurs due to the fact that a transmitted symbol may take any one of several paths in the transmission channel (multiple reflections off surrounding objects). When the time interval between two possible paths is greater than the duration of a symbol, two successive symbols might interfere with each other.

At the receiver, in order to correct the interference between symbols, it is necessary to use an equalizer which, in order to operate properly, must know the impulse response of the transmission channel.

In the GSM system, a sequence of specific symbols referred to as the "training sequence" is inserted into the middle of each packet that is transmitted. The training sequence is defined as a function of the characteristics of the transmission channel, and, in particular, of its length L as defined by the time interval between the shortest path and the longest path (the length of the transmission channel may be expressed in number of symbol durations).

In the GSM system, the impulse response $h(t)$ of the channel is calculated as follows: the receiver has a replica of the training sequence used, and it correlates the replica with the corresponding received sequence.

The result of this cross-correlation constitutes a set of coefficients $h(i)$ (where i varies over the range 0 to L) that are intended to be fed to the equalizer. The shortest path corresponds to $h(0)$. Channel estimation is performed after synchronization.

That known technique suffers from the major drawback that a training sequence must be provided in each data packet, to the detriment of the useful data-rate.

OBJECTS AND SUMMARY OF THE INVENTION

A particular object of the invention is to mitigate the various drawbacks from which the state of the art suffers.

More precisely, an object of the invention is to provide a time and frequency synchronization technique that makes it possible to limit the amount of resources required, with respect both to frequency (in particular for CDMA) and to time (for TDMA).

Another object of the invention is to provide such a technique that is simple to implement in receivers, and that is cheap.

Another object of the invention is to provide such a technique that is compatible with satellite broadcasting, i.e., in particular, that takes into account both propagation times and frequency displacement, especially Doppler displacement.

Another object of the invention is to provide a channel equalization technique making it possible to obtain a higher useful data-rate than that made possible by known techniques, in particular for CDMA systems.

Another object of the invention is to provide such techniques that use a single control signal.

The invention achieves these objects and others that appear below by providing a control signal for receivers, which control signal is formed by juxtaposing two signal elements of equal duration, and time symmetrical.

The signal may be constructed from a digital sequence, or it may be obtained in analog manner.

When it is constructed from a digital sequence, the signal may comprise at least one first pseudo-random noise digital sequence of minimum synchronization $s(0)$ to $s(N_s-1)$ and, periodically, at least one second digital sequence $s(N_s-1)$ to $s(0)$, corresponding to the inverse, obtained by time symmetry, of said first sequence.

In this way, the invention provides in particular a structure for a control signal, also referred to as a "pilot signal", or "synchronization signal", that can be used in particular for performing time and frequency synchronization on receivers and for performing channel equalization.

Conventionally, such a signal includes a pseudo-random noise sequence that is known to the receivers, and that is repeated continuously (CDMA system) or regularly (TDMA system). In accordance with the invention, an inverse sequence (i.e. a sequence obtained by time symmetry) is inserted periodically.

As described below, this signal structure makes it possible, after analysis, to recover the time reference of the base station, and to measure the Doppler displacement. In particular, a transmitter produces a control signal and transmits it to a receiver which analyzes the control signal and is thereby enabled to perform the aforementioned recovery and measurement. The transmitter, receiver, and control signal can be viewed as a transmission system (see FIG. 11).

If the synchronization signal is constructed digitally, then symmetry exists at two levels: both with respect to the pseudo-random noise digital sequence, and also with respect to the corresponding modulated signals. As a result, the second portion may either be obtained at digital level, or else be directly synthesized at modulated signal level.

The inverse second sequence is inserted periodically, with a period taking account, in particular, of the probability of false alarms, and of the maximum variation in Doppler displacement that is accepted by the receiver between two successive estimates.

In a preferred embodiment of the invention, said signal comprises said first sequence, then said second sequence, alternately.

Such a signal may in particular be used for synchronizing CDMA receivers, or TDMA receivers.

For TDMA receivers, the signal may be in the form of synchronization packets, inserted regularly in a main signal, each of said synchronization packets comprising said first sequence, then said second sequence, successively.

In an advantageous embodiment of the invention, said signal is transmitted via satellite.

The invention also provides time and frequency synchronization apparatus designed to equip a digital signal receiver, and using a signal as described above.

Advantageously, such apparatus comprises:
a sampler delivering series of samples $x(i)$ of said synchronization signal corresponding to said sequences;
a first shift register comprising N cells, fed by said sampler;
a second shift register comprising N cells, fed by the output of said first shift register;
multiplication means for multiplying in pairs the contents of the same-rank cells of said first shift register and of said second shift register, the multiplication means delivering N values $c(0)$ to $c(N-1)$; and
spectrum analysis means for performing spectrum analysis on said N values, which means deliver both first information representing a time reference, and also second information representing the frequency displacement, e.g. the Doppler displacement.

Such apparatus may also be used to estimate the impulse response of the transmission channel.

The invention also provides a method of performing time and frequency synchronization by using such a signal, said method including the following steps:
receiving 2N samples respectively corresponding to the $N_s$ digital elements of said first sequence $s(0)$ to $s(N_s-1)$ and to the $N_s$ digital elements of said second sequence $s(N_s-1)$ to $s(0)$;
multiplying in pairs the same-rank digital elements of each of said sequences, thereby delivering N values $c(i)=x(i)*x(N-1-i)$; and
performing spectrum analysis on said N values, so as to determine both first information representing a time reference, and also second information representing the frequency displacement, e.g. the Doppler displacement.

Advantageously, said values $c(i)$ may be written as follows:

$$c(nT_e) = \tfrac{1}{2} \cdot \cos(2\pi\delta(2N-1)T_e + 2\Phi(nT_e)) + \tfrac{1}{2} \cdot \cos(4\pi\delta nT_e - (2\pi\delta(2N-1)T_e) \quad (1)$$

where n is an index varying over the range 0 to N−1;
$T_e$ is the sampling period of said synchronization signal;
$\delta$ represents said frequency displacement; and
$\Phi$ represents said time reference;
and said analysis step includes the following steps:
analysis of the first term of the equation (1), corresponding to a spread spectrum signal, so as to determine said time reference; and
analysis of the second term of the equation (1), corresponding to a sine-wave of frequency $2\delta$, so as to determine said information representing said Doppler displacement.

The invention also provides a time and frequency synchronization method for digital signal receivers, in which method the following are transmitted to said receivers: at least one first synchronization pseudo-random noise digital sequence $s(0)$ to $s(N_s-1)$ and, at least periodically, at least one second digital sequence $s(N_s-1)$ to $s(0)$, corresponding to the inverse, obtained by time symmetry, of said first sequence.

In other words, said second sequence may be transmitted over a channel other than the channel over which the first sequence is transmitted. In which case, it is not necessary to interrupt transmission of the first sequence to make it possible to transmit the second sequence.

BRIEF DESCRIPTION OF THE DRAWINGS

Other characteristics and advantages of the invention will appear on reading the following description of two preferred embodiments of the invention given merely by way of non-limiting example, and with reference to the accompanying drawings, in which:

FIG. 1 shows the structure of a known type of pilot signal for a CDMA radio-telephone system;

FIG. 2 shows the structure of a pilot signal of the invention, also for a CDMA radio-telephone system;

FIG. 3 is a block diagram showing time and frequency synchronization apparatus implementing the signal shown in FIG. 2;

FIG. 4 shows the two synchronization packets conventionally used in the GSM system, one of the packets being used for frequency synchronization and the other for time synchronization;

FIG. 5 shows a single common time and frequency synchronization packet of the invention, that may be implemented in the GSM system, or in any other TDMA system.

FIG. 6 is a diagram showing the radio coverage zone of a satellite;

FIG. 7 shows three parameters d, φ, and θ enabling a mobile station to be located relative to a satellite;

FIG. 8 is a flow chart showing the position finding method;

FIG. 9 shows the principle implemented for removing uncertainty about the sign of the instantaneous elevation angle; and FIG. 10 is a particular case of FIG. 4, corresponding to the Globalstar radio-telephone system.

MORE DETAILED DESCRIPTION

Figure 6:
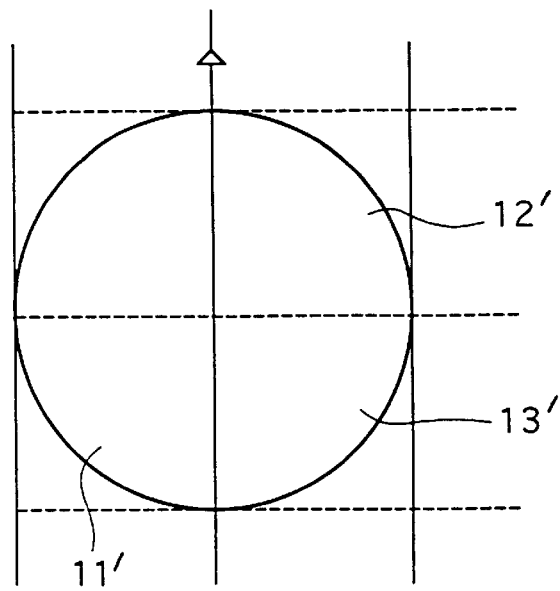
FIGS. 6 to 10 show how the present invention may be applied to radio position finding.

Two preferred embodiments of the invention are described below, corresponding respectively to a CDMA system (Globalstar) and to a TDMA system (GSM).

The Globalstar system is a CDMA cellular system which aims to offer worldwide coverage. It is composed of three segments:

- the space segment formed of 48 low-orbit (1,414 km) satellites, of 8 back-up satellites, and of 2 control centers for controlling the constellation;
- the terminals which are portable, which are installed in mobile stations or in fixed stations, and which are mono-mode (i.e. capable of inter-operating with Globalstar only) or dual-mode (i.e. capable of inter-operating both with Globalstar and with a terrestrial cellular system such as GSM or DCS 1800); and
- the connection stations which enable links to be set up with public switched networks, but which also manage mobility so as to make it possible to update data bases indicating both the location of a mobile station, and the attributes of the services to which the mobile station has subscribed; this capability makes integration possible for mobile networks; in this way, it is possible for dual-mode subscribers to retain their mobile number, and to be called either in the terrestrial network or in the satellite network without having to intervene.

The basic service offered by Globalstar is a telephone service. Globalstar also enables data to be transmitted. Globalstar is also going to enable a new service to be offered: the roving range is to be extended to the entire world. Clearly, the extension will however be limited to service zones (i.e. outside dense portions of built-up areas in which coverage is, in principle, provided by a cellular network). Outside such service zones, it will be possible to have a calling signal supplied by a one-way radio-messaging service.

Because of its transparency and its integration into public networks, Globalstar will make it possible to offer the same services as those offered by networks operated by cellular operators.

FIG. 1 shows the structure of a known type of pilot signal for a CDMA system such as Globalstar. Such a pilot signal is formed by uninterrupted repetition of the same pseudo-random noise (PN) sequence 11, constituted by a series of $N_c$ bits $12_0$ to $12_{N_c-1}$.

For example, that PN sequence may be a sequence of 32767 ($10^{15}-1$) bits delivered by a suitable generator polynomial. The sequence is known to the receivers, so that they can be time synchronized on the received signal. Frequency synchronization is performed independently, and no reliable information is available about the Doppler displacement.

The invention provides a novel synchronization signal which is shown in FIG. 2, and which enables the receivers to be time and frequency synchronized.

The signal of the invention also includes a first sequence PN(n) 21 (referred to as a "direct sequence") that is transmitted regularly. But the first sequence 21 is replaced at regular intervals by a second PN sequence (referred to as an "inverse sequence") obtained by time symmetry from the first PN sequence.

The symmetrical second sequence may be obtained at binary level (by inverting the binary reading order) or directly at modulated signal level.

The second sequence is inserted regularly into the pilot signal at a rate that is a function of the requirements of the system (e.g. in terms of acceptable number of false detections, and of acceptable Doppler displacement). In the embodiment shown in FIG. 2, the sequences transmitted are the direct sequence 21, then the inverse sequence 22 alternately.

FIG. 3 is a diagram showing synchronization apparatus using the signal shown in FIG. 2.

The received pilot signal 31 is sampled by an ADC converter 32 which delivers samples x(i) with a sampling period $T_e$.

The samples are fed into a first shift register comprising N (length of the PN sequences) cells. The sampling period is chosen so that $T_{PN}=N \cdot T_e$ corresponds to the duration of the PN sequence.

The output of the register 33 is looped back (34) to the input of a second shift register also comprising N cells. In this way, at a given instant:

register 33 contains samples x(0) to x(N−1); and
register 35 contains samples x(N) to x(2N−1).

The apparatus further includes multiplication means $36_0$ to $36_{N-1}$, each of which multiplies two cells from registers 33 and 35 so as to deliver N coefficients 37 c(i) such that:

$$c(i)=x(i)\cdot x(2N-1-i),$$

where i varies over the range 0 to N-1.

These coefficients may be written as follows:

$$c(nT_e) = \cos(2\pi\delta nT_e + \phi(nT_e))\cos(2\pi\delta(2N-1-n)T_e + \phi((2N-1-n)T_e))$$

$$= \frac{1}{2} \cdot \cos(2\pi\delta(2N-1-n)T_e + \phi(nT_e) + \phi((2N-1-n)T_e)) +$$

$$\frac{1}{2} \cdot \cos(4\pi\delta nT_e - 2\pi\delta(2N-1-n)T_e + \phi(nT_e) - \phi((2N-1-n)T_e))$$

When, at a given instant, shift register 33 contains exactly one direct sequence, and shift register 35 contains exactly one inverse sequence ("coincidence" is then said to have occurred), the following equation applies:

$$\phi(nT_e)=\phi[(2N-1-n)T_e]$$

The signal output by the multipliers then becomes:

$$c(nT_e) = \tfrac{1}{2} \cdot \cos(2\pi\delta(2N-1)T_e + 2\phi(nT_e)) + \tfrac{1}{2}\cdot\cos(4\pi\delta nT_e - 2\pi\delta(2N-1-n)T_e)$$

It is easy to see that:
the first term is a spread spectrum signal; and
the second term is a pure sine-wave, which is a function of $2\delta$.

When coincidence does not occur, only a spread spectrum signal is obtained.

The sequence of coefficients output by the multiplier is conveyed to spectrum analysis means 38. By performing such analysis every $T_e$, it is possible, using conventional techniques:

to acquire the time reference of the base station, whenever coincidence occurs; and to measure the value of the Doppler displacement, by measuring the frequency of the sine-wave equal to $2\delta$.

It should be noted that knowledge of the Doppler displacement enables frequency synchronization to be controlled, but it may also be useful for other applications, such as radio position finding, as described below.

Furthermore, it should also be noted that it is not obligatory to insert the inverse sequence into the pilot signal. In another embodiment, the inverse sequence may be transmitted on another frequency. In which case, the pilot signal containing the direct sequence only is transmitted continuously, whereas the inverse sequence is transmitted at least periodically.

In which case, the apparatus shown in FIG. 3 must naturally be adapted, with the two shift registers not in cascade, but rather being fed independently with each sequence.

More generally, other structures are possible for the apparatus provided that the coefficients $c(i)$ are calculated and then analyzed.

The invention may also be applied to TDMA signals. As indicated above, in the GSM system, two distinct packets are currently provided for performing synchronization, as shown in FIG. 4.

The first packet 41 referred to as the "FCCH", is a pure sine-wave. It makes frequency synchronization possible. The second packet 42 referred to as the "SCH", comprises a binary sequence whose autocorrelation properties make it possible to recover time synchronization.

The two packets 41 and 42 are transmitted regularly on a BCCH carrier provided for that purpose.

The invention proposes to replace those two packets with a single packet making both time and frequency synchronization possible. Such a packet is shown in FIG. 5.

This packet includes an inverted pseudo-random noise sequence 52, complying with the above described principle. In other words, the structure of the packet is symmetrical about an axis of symmetry 53. The processing performed on this packet is identical to that described with reference to FIG. 3. This technique makes it possible, in particular, to save having to transmit one packet, or to reduce the period between two synchronization packets.

Furthermore, as indicated above, the signal of the invention may be used to estimate the impulse response of the transmission channel, in particular so as to perform channel equalization.

A terrestrial TDMA system may be used as an example, and it may be assumed that the base station transmits the packet containing the pilot signal at regular time intervals. After passing through the transmission channel, the following signal is received by the mobile station:

$$r(t) = A_0\cos(2\pi\delta_0 t + \phi(t)) + \Sigma_n A_n \cos(2\pi\delta_n(t-\tau_n)+\phi(t-\tau_n))$$

where n varies over the range 1 to M.
The signal is constituted by:
a direct component (amplitude $A_0$+Doppler displacement $\delta_0$); and
M secondary components (amplitude $A_N$+Doppler displacement $\delta_N$).

Analysis of the signal by the apparatus shown in FIG. 3 reveals a number of coincidences that is equal to the total number of the components of the signal (L+M). To determine the impulse response of the transmission channel, it is merely necessary to measure the relative difference in time and in amplitude between the first coincidence (taken as being the origin) and the following coincidences. If $\Delta(0,n)$ designates the time interval (expressed as a function of $T_c$) between the occurrence of the first coincidence of index 0 and the occurrence of the coincidence of index n, the following is obtained:

$$\tau_n = 2\Delta(0, n)$$
$$h(\tau_n) = A'n/A'0$$
$$h(t) = 0 \text{ for } t \neq t_n$$

where A' designates the amplitude of the sine-wave detected during the coincidence.

In this way, it is no longer necessary to insert a training sequence into each packet that is transmitted in order to determine the impulse response of the channel. This can be achieved by means of the signal of the invention.

In the above description, a control signal for controlling a receiver is described that is formed by juxtaposing two signal elements of equal duration and time symmetrical. In particular, it has been demonstrated that the resulting signal facilitates acquisition of initial synchronization for a terminal in a satellite radio-telephone system, independently of the access mode used (time division multiple access (TDMA) or code division multiple access (CDMA)).

Setting up and maintaining a radio link between a terminal and an LEO satellite constitute two operations that are difficult insofar as the signals that are transmitted are affected simultaneously by a large amount of Doppler displacement and by a large variation in propagation time.

Transmitted at regular time intervals, the signal of the invention makes it possible to acquire both time and frequency synchronization simultaneously (whereas in the GSM system two specific packets need to be transmitted to achieve the same result), thereby saving a channel.

It is possible to do even better, in a TDMA system, by generalizing the structure provided by the invention to all of the packets that are transmitted (both signalling and traffic packets). Acquisition is then made possible at any time by using any transmitted packet.

However, it should be noted that the term "control signal" which is used to define the present invention is not limited to a specific application, but rather it applies to any signal that might be used to perform a control function on reception, in the sense defined above, i.e. in particular a synchronization function or an equalization function.

The advantages are as follows:

the notion of a dedicated synchronization signal is quite simply discarded;

a saving of two channels is made compared with a conventional TDMA system (i.e. the FCCH and SCH channels in the GSM system);

an increase in speed is achieved during handover of a call from one cell to another in terrestrial radio-telephone systems;

an increase in speed is achieved during changeover of a call from one satellite to another in satellite radio-telephone systems; and a reduction is achieved in the complexity of the detecting and correcting codes used to protect the sequence of symbols that is transmitted (the structure of the invention is equivalent to duplicating the binary sequence that is transmitted).

An application of the invention to radio position finding is described below with reference to FIGS. 6 to 10.

Geographically locating a mobile station is one of the services proposed for future satellite radio-telephone systems. More generally, radio position finding via satellite is a technique that is destined to develop. The radio position finding method described below only requires reception of signals transmitted by a single satellite.

The implementation described below is in particular organized to be used in the Globalstar system.

This implementation adds a further feature to the system, namely locating mobile stations.

The radio coverage zone of the satellite is shown in FIG. 6. To a first approximation, it may be described as being in the form of a disk 11' having a top half-disk 12' and a bottom half-disk 13'.

The top half-disk 12' defines a zone in which the signal coming from the satellite and received by the terminal is affected by positive Doppler displacement (the satellite is moving closer to the terminal).

The bottom half-disk 13' defines a zone in which the signal coming from the satellite and received by the terminal is affected by negative Doppler displacement (the satellite is moving away from the terminal).

The two half-disks 12' and 13' are defined by the zero Doppler diameter 14' which is perpendicular to the path 15' followed by the satellite.

Figure 7:
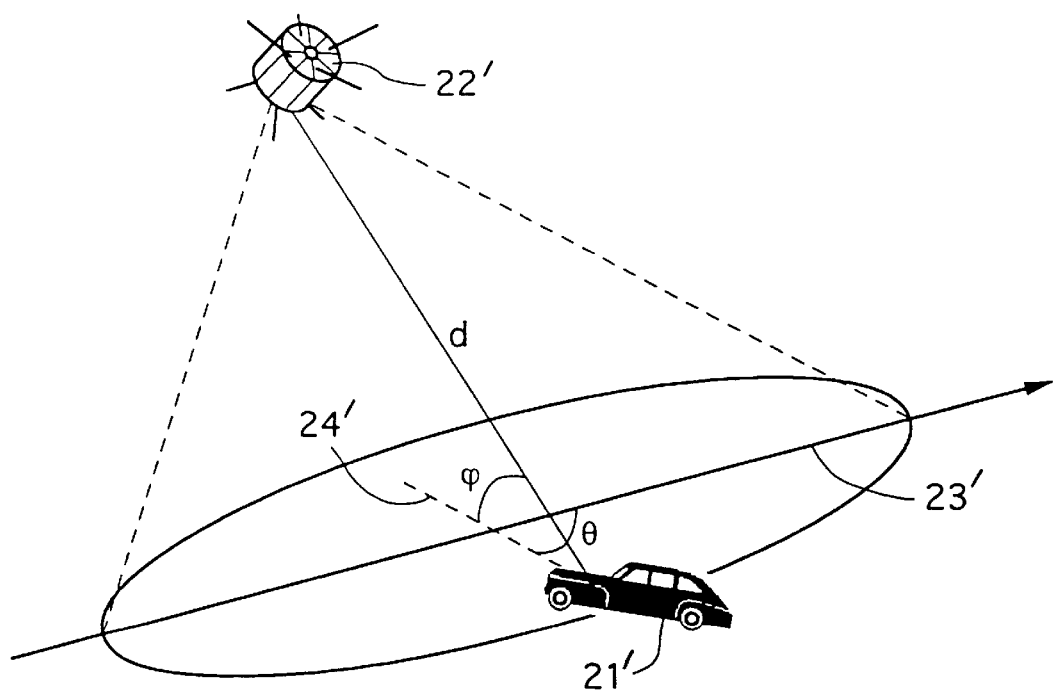

FIG. 7 shows the parameters required for locating a mobile station in conventional manner. It should be noted that the implementation described does not relate specifically to this position finding method, but rather to the way in which the various required parameters are determined.

It is known that the instantaneous position of the mobile station 21' relative to the LEO satellite 22' is entirely defined by the following three parameters:

the instantaneous distance d between the satellite 22' and the mobile station 21';

the instantaneous elevation φ of the satellite 22' relative to the terminal 21'; and the angle θ between the projections on the surface of the Earth of the path 23' followed by the satellite and of the satellite-terminal direction 24'.

Figure 8:
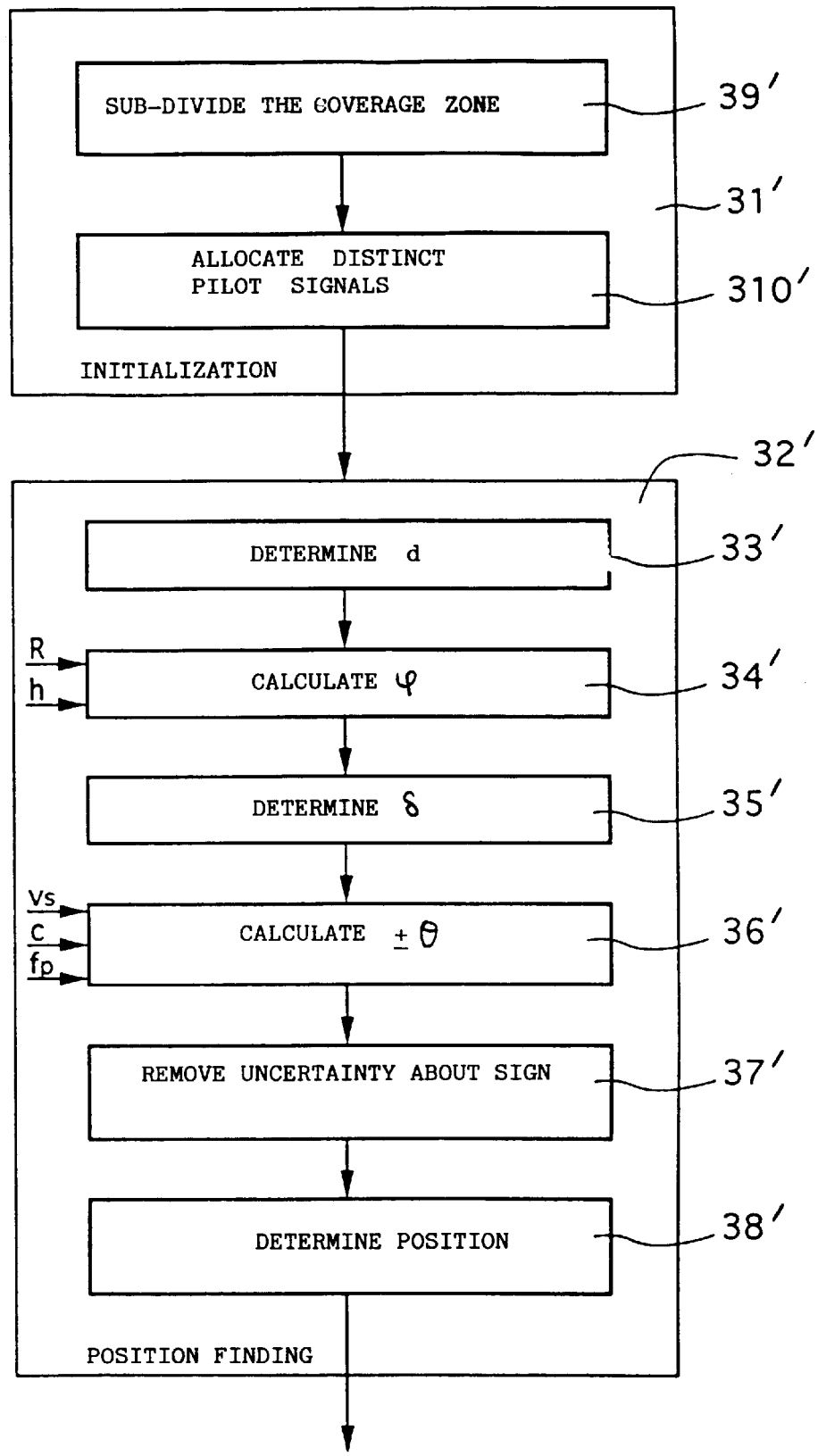

The various parameters are determined by means of the method shown in FIG. 8.

The method comprises two types of processing. Firstly, initialization processing 31' performed once and for all at the satellite, and making it possible to remove the uncertainty about the sign of θ, as described below, and secondly position finding processing 32' that can be performed at any time and by any mobile station equipped with suitable processing means.

Locating 32' a mobile station consists in determining the position of a mobile station on the basis of the signals transmitted by a single satellite.

For that purpose, the method firstly includes a step 33' in which the distance d between the satellite and the mobile station is determined.

Conventionally, this may be achieved, for example, by measuring the propagation time of a signal transmitted between the satellite and the terminal.

Then the instantaneous elevation θ of the satellite relative to the terminal is calculated (34') on the basis of d, of the radius of the Earth R, and of the altitude h of the satellite. R and h are known to the mobile terminal, if it performs all of the position finding processing itself. In which case, more generally, the mobile terminal knows the ephemeris of the satellite in question.

To limit the complexity of the terminal, most of the processing relating to determining the position of the mobile station may also be performed by the corresponding terrestrial station.

Furthermore, the Doppler displacement δ is determined. This operation is performed by the mobile station during the initial synchronization, and then at regular intervals.

In this technique, the satellite transmits a pilot signal including signal elements that are time symmetrical, e.g. at least one first synchronization pseudo-random noise digital sequence $x(0)$ to $x(N-1)$ and, periodically, at least one second digital sequence $x(N-1)$ to $x(0)$ corresponding to the inverse, obtained by time symmetry, of said first sequence.

After suitable analysis has been performed, this signal structure makes it possible to recover the time reference of the base station, and to measure the Doppler displacement.

It is known that the Doppler displacement δ corresponds to:

$$\delta = v_s/c \cdot f_p \cdot \cos(\theta) \cdot \cos(\phi)$$

where $v_s$ is the relative speed of the satellite;

c is the speed of light; and $f_p$ is the carrier frequency.

These three items of information are known to the terminal. It is therefore possible to calculate (36') cos(θ) on the basis of the equation (1) and therefore θ, in absolute terms.

Figure 9:
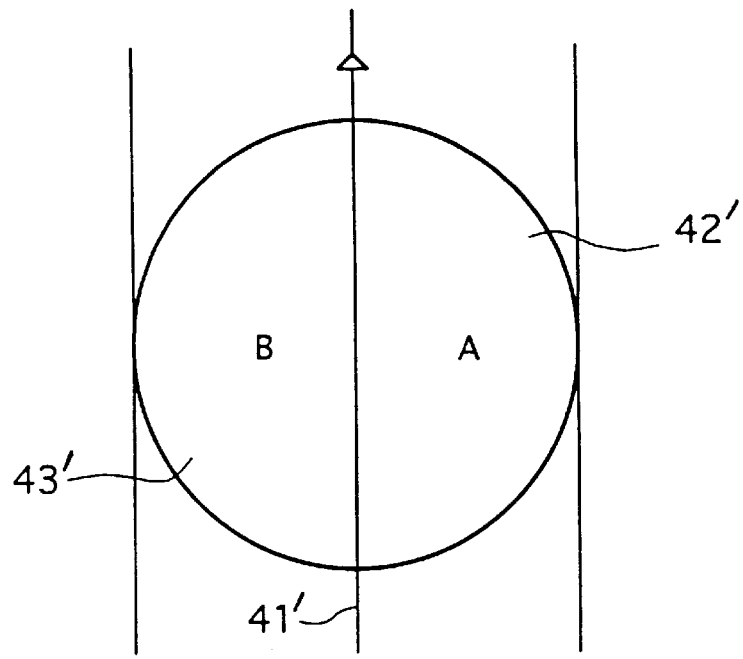

An uncertainty remains about the sign of θ. This uncertainty can be removed by using two specific pilot signals A and B, and by sub-dividing the radio coverage zones into two zones relative to the path of the satellite, as shown in FIG. 9:

synchronization signal A is broadcast only over the half-disk 42' on the right of the path 41'; and synchronization signal B is broadcast only over the half-disk 43' on the left of the path 41'.

Figure 10:
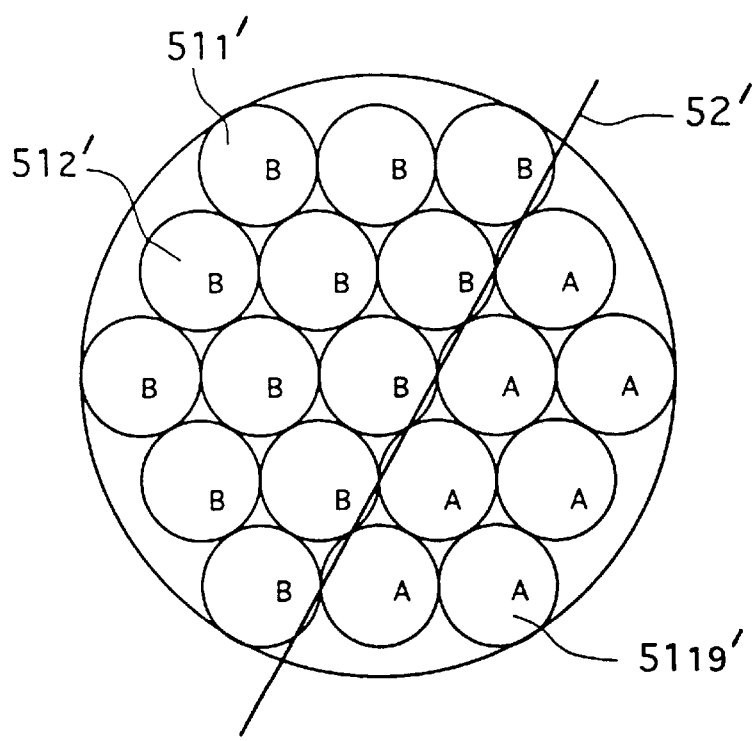
Figure 11:
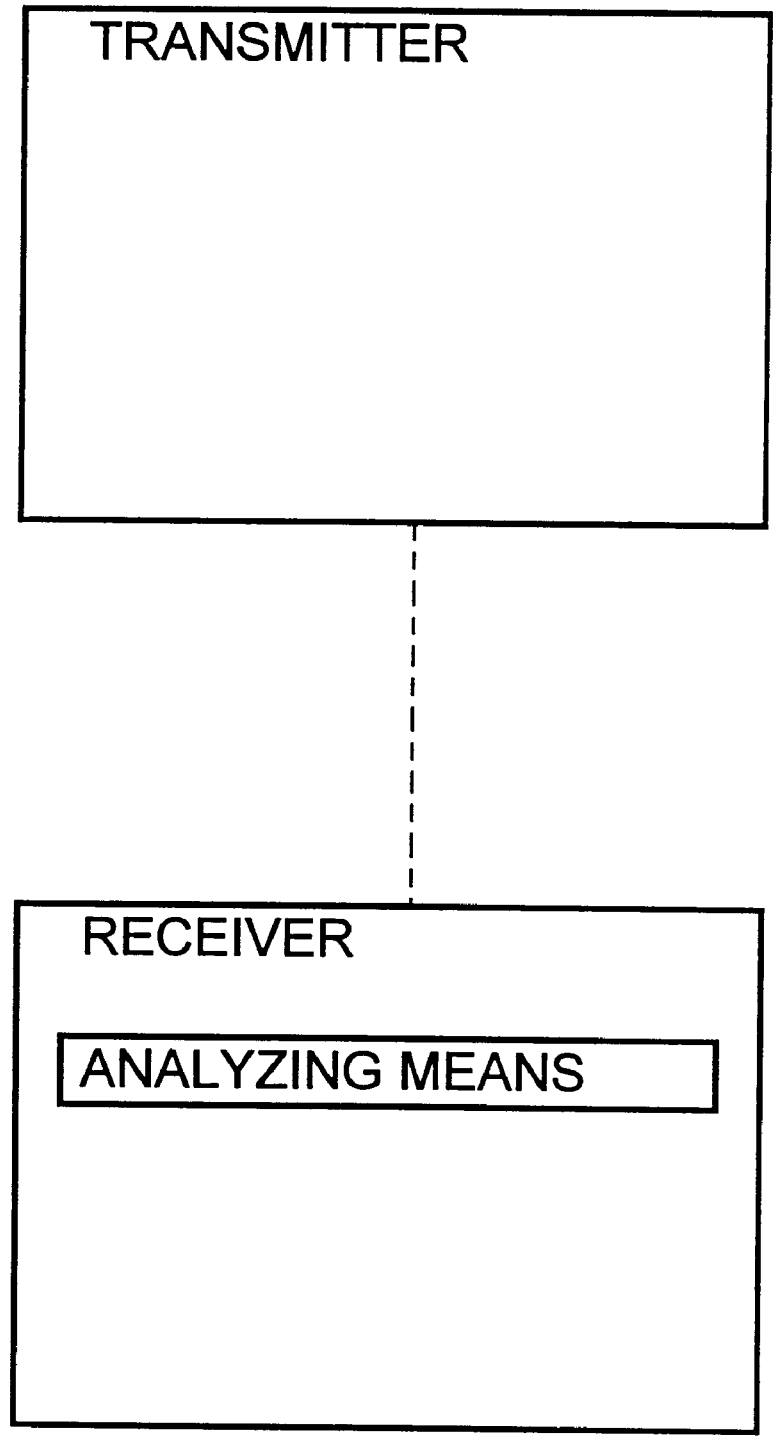
FIG. 11 shows a transmission system.

This corresponds to the initialization 31' during which the coverage zone is sub-divided (39') into two distinct zones to which distinct synchronization signals are allocated (310') that are naturally known to the terminals. In the particular case of the Globalstar system, it is known that the radio coverage zone is likened to a disk composed of 19 beams $51'_1$ to $51'_{19}$, as shown in FIG. 10.

The distribution of the pilot signals A and B is similar on either side of the path 52' of the satellite.

In this way, position finding 32' includes a step 37' in which the uncertainty about the sign of θ is removed by analyzing the frequency characteristics of the received pilot signal which enables the terminal to locate itself in one or other of the half-disks 42' and 43'.

As indicated above, knowledge of the triplet (θ, φ, δ) makes it possible to determine (38') the position of the mobile station.

That final step is advantageously performed by the terrestrial station. In which case the role of the terminal is limited to:

making it possible for the terrestrial station to measure the satellite-mobile station propagation time;

measuring the Doppler displacement (sign and absolute value);

determining the detected synchronization signal (A or B); and transmitting these items of information to the terrestrial station.

Knowledge of the propagation time, of the Doppler displacement, of the detected synchronization signal, of the ephemeris of the LEO satellite, and of the radius of the Earth, makes it possible for the terrestrial station to calculate the position of the mobile station, and optionally to transmit said position thereto (position finding service).

I claim:

1. A receiver, comprising:
    means for receiving a control signal that includes:
        two signal elements, including a first signal element and a second signal element;
        said two signal elements being of equal duration and time symmetrical; and
    analyzing means for determining time and frequency synchronization of said receiver, including:
        a sampler delivering series of samples s(i) of said control signal corresponding to said signal elements;
        a first shift register comprising N cells, fed by said sampler;
        a second shift register comprising N cells, fed by the output of said first shift register;
        multiplication means for multiplying in pairs the contents of the same-rank cells of said first shift register and of said second shift register, the multiplication means delivering N values c(0) to c(N−1); and
        spectrum analysis means for performing spectrum analysis on said N values, said spectrum analysis means delivering first information representing a time reference, and second information representing the frequency displacement.

2. A receiver according to claim 1, adapted to receive said control signal in a CDMA mode.

3. A receiver according to claim 1, adapted to receive said control signal in a TDMA mode.

4. A method of performing time and frequency synchronization comprising:
    sending a control signal having:
        two signal elements, including a first signal element and a second signal element;
        said two signal elements being of equal duration and time symmetrical;
    receiving 2N samples of said control signal respectively corresponding to $N_s$ digital elements of said first signal element and to $N_s$ digital elements of said second signal element;
    multiplying in pairs the same-rank digital elements of each of said two signal elements, thereby delivering N values $c(i)=x(i)*x(N-1-i)$; and
    performing spectrum analysis on said N values, so as to determine both first information representing a time reference, and also second information representing the frequency displacement.

5. A method according to claim 4, wherein:
    said values c(i) satisfy:

$$c(nT_e) = \tfrac{1}{2} \cdot \cos(2\pi\delta(2N-1)T_e + 2\Phi(nT_e)) + \tfrac{1}{2} \cdot \cos(4\pi\delta n T_e - (2\pi\delta(2N-1)T_e))$$

where n is an index varying over the range 0 to N−1,
    $T_e$ is the sampling period of a synchronization signal,
    $\delta$ represents said frequency displacement, and
    $\Phi$ represents said time reference;

said analysis step includes the following steps:
    analysis of the first term of the equation, corresponding to a spread spectrum signal, so as to determine said time reference; and
    analysis of the second term of the equation, corresponding to a sine-wave of frequency $2\delta$, so as to determine said information representing said frequency displacement.

6. The method according to claim 4, wherein said step of sending said control signal is performed so that said control signal is sent in a CDMA mode.

7. The method according to claim 4, wherein said step of sending said control signal is performed so that said control signal is sent in a TDMA mode.

8. An equalization apparatus comprising:
    a sampler adapted to deliver a series of samples s(i) of a control signal having two time symmetrical signal elements of equal duration;
    a first shift register comprising N cells, fed by said sampler;
    a second shift register comprising N cells, fed by the output of said first shift register;
    multiplication means for multiplying in pairs the contents of the same-rank cells of said first shift register and of said second shift register, the multiplication means delivering N values c(0) to c(N−1); and
    estimation means for estimating the impulse response of a transmission channel.

9. A receiver for receiving digital signals transmitted in CDMA mode, said receiver including apparatus according to claim 8.

10. A receiver for receiving digital signals transmitted in TDMA mode, said receiver including apparatus according to claim 8.

11. A time and frequency synchronization method for digital signal receivers, comprising:
    receiving at least one first synchronization pseudo-random noise digital sequence s(0) to $s(N_s-1)$; and
    receiving at least one second digital sequence $s(N_s-1)$ to s(0), corresponding to the inverse, obtained by time symmetry, of said first sequence; and
    combining said at least one first pseudo-random noise digital sequence with said at least one second digital sequence to determine said time and frequency synchronization.

12. A transmission system, comprising:
    a transmitter transmitting a control signal, and
    a receiver receiving said control signal;
    wherein said receiver analyzes said control signal and thereby is enabled to receive a subsequent transmission with predetermined frequency and time synchronization;
    wherein said control signal includes a first signal element and a second signal element, each said element being of equal duration; and
    wherein said first signal element is time symmetrical with respect to said second signal to element.

13. The system according to claim 12, wherein:
    said control signal is received by said receiver as a CDMA signal; and
    said receiver comprises analyzing means for determining said predetermined frequency and time synchronization for said receiver.

14. The system according to claim 12, wherein:
    said receiver further comprises analyzing means for determining said predetermined frequency and time for said receiver; and said analyzing means equalizes other signals of said receiver.

15. The system according to claim 12, wherein said control signal is received by said receiver from a satellite.

16. The system according to claim 12, wherein said first signal element comprises a first pseudo-random noise digital sequence s(0) to s($N_s$1) and said second signal element comprises a second digital sequence s($N_s$-1) to s(0), corresponding to the inverse, obtained by time symmetry, of said first sequence.

17. The system according to claim 16, wherein said control signal comprises said first sequence, then said second sequence, alternately.

18. The system according to claim 16, wherein:
said control signal is received by said receiver as a TDMA signal in the form of synchronization packets, inserted regularly in a main signal, each of said synchronization packets comprising said first sequence, then said second sequence, successively.

19. The system according to claim 16, wherein said receiver further comprises analyzing means for determining said predetermined frequency and time for said receiver, and said analyzing means comprises:
a sampler delivering series of samples s(i) of said control signal corresponding to said sequences;
a first shift register comprising N cells, fed by said sampler;
a second shift register comprising N cells, fed by the output of said first shift register;
multiplication means for multiplying in pairs the contents of the same-rank cells of said first shift register and of said second shift register, the multiplication means delivering N values c(0) to c(N-1); and
spectrum analysis means for performing spectrum analysis on said N values, said spectrum analysis means delivering first information representing a time reference, and second information representing the frequency displacement.

20. The system according to claim 19, wherein said receiver receives digital signals transmitted in one of CDMA mode and TDMA mode.

21. The system according to claim 16, wherein:
said receiver comprises an equalization apparatus for performing equalization by using said control signal; and
said equalization apparatus comprises:
a sampler delivering a series of samples s(i) of a synchronization signal corresponding to said sequences;
a first shift register comprising N cells, fed by said sampler;
a second shift register comprising N cells, fed by the output of said first shift register;
multiplication means for multiplying in pairs the contents of the same-rank cells of said first shift register and of said second shift register, the multiplication means delivering N values c(0) to c(N-1); and
estimation means for estimating the impulse response of a transmission channel.

22. The system according to claim 21, wherein said receiver receives digital signals transmitted in one of CDMA mode and TDMA mode.

23. The system according to claim 16, wherein said predetermined frequency and time synchronization are determined by said receiver according to a method comprising the steps of:

receiving 2N samples respectively corresponding to the $N_s$ digital elements of said first sequence s(0) to s($N_s$-1) and to the $N_s$ digital elements of said second sequence s($N_s$-1) to s(0);
multiplying in pairs the same-rank digital elements of each of said sequences, thereby delivering N values c(i)=x(i)*x(N-1-i); and
performing spectrum analysis on said N values, so as to determine both first information representing a time reference, and also second information representing the frequency displacement.

24. The system according to claim 23, wherein:
said values c(i) may be written as follows:

$$c(nT_e)=\tfrac{1}{2}\cos(2\pi\delta(2N-1)T_e+2\Phi(nT_e))+\tfrac{1}{2}\cos(4\pi\delta nT_e-(2\pi\delta(2N-1)T_e) \qquad (1)$$

where n is an index varying over the range 0 to N-1,
$T_e$ is the sampling period of a synchronization signal,
$\delta$ represents said frequency displacement, and
$\Phi$ represents said time reference; and
said performing spectrum analysis step includes the steps of:
analyzing the first term of the equation, corresponding to a spread spectrum signal, so as to determine said time reference; and
analyzing the second term of the equation, corresponding to a sine-wave of frequency $2\delta$, so as to determine said information representing said frequency displacement.

25. The system according to claim 23, wherein said receiver receives digital signals transmitted in one of CDMA mode and TDMA mode.

26. A synchronization apparatus for a receiver, comprising:
means for detecting signal elements of a received control signal; and
means for analyzing said control signal by combining one of said signal elements and another of said signal elements, said one and said another signal element being of equal duration and in time symmetry.

27. The apparatus according to claim 26, wherein:
said control signal is received by said receiver as a CDMA signal; and
said analyzing means determines a predetermined frequency and time for said receiver.

28. The apparatus according to claim 26, wherein said analyzing means determines a predetermined frequency and time for said receiver; and also equalizes other signals of said receiver.

29. The apparatus according to claim 26, wherein said control signal is received by said receiver from a satellite.

30. The apparatus according to claim 26, wherein said first signal element comprises a first pseudo-random noise digital sequence s(0) to s($N_s$-1) and said second signal element comprises a second digital sequence s($N_s$-1) to s(0), corresponding to the inverse, obtained by time symmetry, of said first sequence.

31. The apparatus according to claim 30, wherein said control signal comprises said first sequence, then said second sequence, alternately.

32. The apparatus according to claim 30, wherein:
said control signal is received by said receiver as a TDMA signal in the form of synchronization packets, inserted regularly in a main signal, each of said synchronization packets comprising said first sequence, then said second sequence, successively.

33. The apparatus according to claim 30, wherein said analyzing means determines a predetermined frequency and time for said receiver, and further comprises:
- a sampler delivering series of samples s(i) of said control signal corresponding to said sequences;
- a first shift register comprising N cells, fed by said sampler;
- a second shift register comprising N cells, fed by the output of said first shift register;
- multiplication means for multiplying in pairs the contents of the same-rank cells of said first shift register and of said second shift register, the multiplication means delivering N values c(0) to c(N−1); and
- spectrum analysis means for performing spectrum analysis on said N values, said spectrum analysis means delivering first information representing a time reference, and second information representing the frequency displacement.

34. The apparatus according to claim 33, wherein said receiver receives digital signals transmitted in one of CDMA mode and TDMA mode.

35. The apparatus according to claim 30, further comprising equalization means for performing equalization by using said control signal, said equalization means comprising:
- a sampler delivering a series of samples s(i) of a synchronization signal corresponding to said sequences;
- a first shift register comprising N cells, fed by said sampler;
- a second shift register comprising N cells, fed by the output of said first shift register;
- multiplication means for multiplying in pairs the contents of the same-rank cells of said first shift register and of said second shift register, the multiplication means delivering N values c(0) to c(N−1); and
- estimation means for estimating the impulse response of a transmission channel.

36. The apparatus according to claim 35, wherein said receiver receives digital signals transmitted in one of CDMA mode and TDMA mode.

37. The apparatus according to claim 30, wherein a predetermined frequency and time synchronization are determined by said synchronization apparatus according to a method comprising the steps of:
- receiving 2N samples respectively corresponding to the $N_s$ digital elements of said first sequence s(0) to s($N_s$−1) and to the $N_s$ digital elements of said second sequence s($N_s$−1) to s(0);
- multiplying in pairs the same-rank digital elements of each of said sequences, thereby delivering N values c(i)=x(i)*x(N−1−i); and
- performing spectrum analysis on said N values, so as to determine both first information representing a time reference, and also second information representing the frequency displacement.

38. The apparatus according to claim 37, wherein:
said values c(i) may be written as follows:

$$c(nT_e)=½·\cos(2\pi\delta(2N-1)T_e+2\Phi(nT_e))+½·\cos(4\pi\delta nT_e-(2\pi\delta(2N-1)T_e) \quad (1)$$

where n is an index varying over the range 0 to N−1,
$T_e$ is the sampling period of a synchronization signal,
δ represents said frequency displacement, and
Φ represents said time reference; and
said performing spectrum analysis step includes the steps of:
- analyzing the first term of the equation, corresponding to a spread spectrum signal, so as to determine said time reference; and
- analyzing the second term of the equation, corresponding to a sine-wave of frequency 2δ, so as to determine said information representing said frequency displacement.

39. The apparatus according to claim 37, wherein said receiver receives digital signals transmitted in one of CDMA mode and TDMA mode.

* * * * *